US012061504B2

(12) United States Patent
Vichare et al.

(10) Patent No.: US 12,061,504 B2
(45) Date of Patent: Aug. 13, 2024

(54) METHOD AND APPARATUS FOR INTELLIGENT OZONE ESTIMATION AND MITIGATION IN A SYSTEM WITH ION DRAG COOLING

(71) Applicant: Dell Products, LP, Round Rock, TX (US)

(72) Inventors: Nikhil M. Vichare, Austin, TX (US); Travis C. North, Cedar Park, TX (US); Mitchell Anthony Markow, Hutto, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 107 days.

(21) Appl. No.: 17/973,093

(22) Filed: Oct. 25, 2022

(65) Prior Publication Data

US 2024/0134434 A1 Apr. 25, 2024
US 2024/0231457 A9 Jul. 11, 2024

(51) Int. Cl.
*G06F 1/26* (2006.01)

(52) U.S. Cl.
CPC ..................................... *G06F 1/26* (2013.01)

(58) Field of Classification Search
CPC ........................................................ G06F 1/26
See application file for complete search history.

(56) References Cited

U.S. PATENT DOCUMENTS

| 6,432,367 B1 | 8/2002 | Munk |
| 7,833,322 B2 | 11/2010 | Botvinnik |
| 2016/0195856 A1 * | 7/2016 | Spero ............... H05B 47/125 |
| | | 700/90 |
| 2021/0156569 A1 | 5/2021 | Shingler |
| 2022/0154944 A1 | 5/2022 | Shingler |
| 2022/0296765 A1 | 9/2022 | Villamagna |
| 2023/0293753 A1 * | 9/2023 | Pai ........................ A61L 2/202 |
| | | 422/107 |

FOREIGN PATENT DOCUMENTS

| WO | 2007/144351 A2 | 12/2007 |
| WO | 2007/144351 A3 | 2/2008 |

* cited by examiner

*Primary Examiner* — Terrell S Johnson
(74) *Attorney, Agent, or Firm* — Prol Intellectual Property Law, PLLC; H. Kenneth Prol

(57) ABSTRACT

An information handling system includes a hardware processor, a memory device, and a PMU to provide power to the processor and memory device. The information handling system includes an ion emitter/collector cooling system including an ion emitter and an ion collector, the ion emitter to generate ions from the atmosphere and the ion collector to collect and deionize those ions, the creation of ions by the ion emitter creating an airflow through and out of the ion collector and at least one sensor to detect and measure at least one non-static ozone predictor measurement describing ozone production at the ion emitter/collector cooling system. Further, the processor executing code instructions of an intelligent ozone estimation and mitigation system including a trained ozone estimation machine learning model to use, as input, the non-static ozone predictor measurement and provide, as output, an ozone estimation value estimating the amount of ozone produced at the ion emitter.

20 Claims, 5 Drawing Sheets

METHOD AND APPARATUS FOR INTELLIGENT OZONE ESTIMATION AND MITIGATION IN A SYSTEM WITH ION DRAG COOLING

FIELD OF THE DISCLOSURE

The present disclosure generally relates to estimating and mitigating ozone generation by an information handling system. The present disclosure more specifically relates to intelligent estimating and mitigating ozone generation by an ion emitter/collector cooling system of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Under various operating conditions, especially high-performance conditions, information handling systems may generate heat which, if not mitigated, may affect performance. The information handling system may thus include a cooling system used to cool hardware therein such as a processing device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
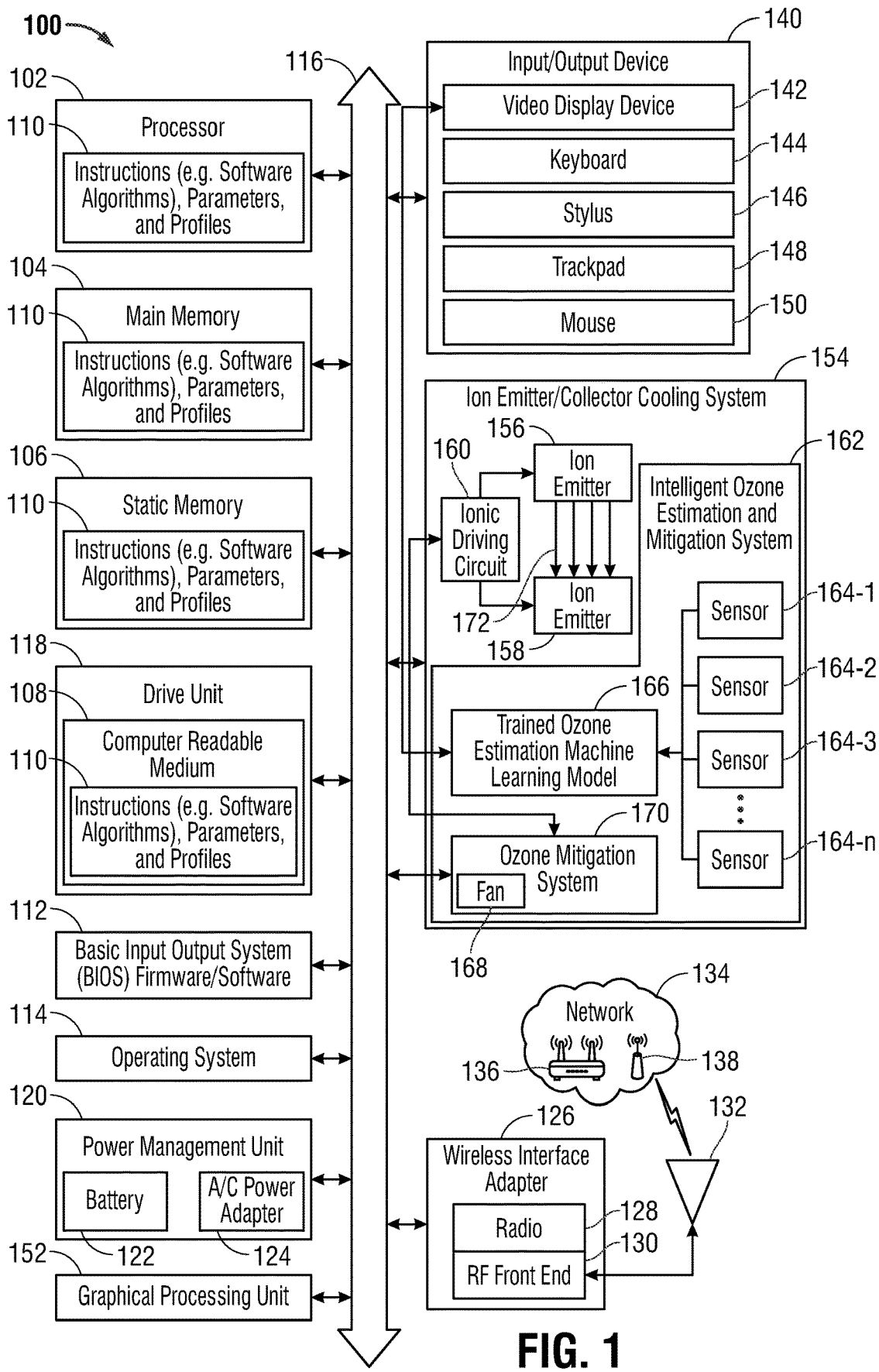
FIG. 1 is a block diagram of an information handling system with an ion emitter/ion collector cooling system and intelligent ozone estimation and mitigation system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems operate to provide computing, data storage, and application resources among other computing resources. The hardware used to provide these resources to the user consume electricity. As a result of the consumption of this electricity, heat is produced within the housing or other structures used to house the hardware. Some information handling systems include a fan used to blow heat from within the housing to an external vent to vent the heated air from within the housing. In a particular example, the cooling systems within the information handling system may include an ion emitter and ion collector of an ion emitter/collector cooling system. The ion emitter may be operatively coupled to a power management unit (PMU) controller that controls an ionic driving circuit to provide a high voltage to the ion emitter. When this high voltage is applied to the ion emitter, ions are created. These ions may be repelled from the ion emitter towards the oppositely-charged ion collector to apply a shear force on the molecules in the atmosphere between the ion emitter and ion collector creating an airflow towards and through thermal fins of the ion collector. During this operation, any number of ions may be created including, but not limited to, ozone ($O_3$). Ozone may, eventually, break down into oxygen ($O_2$) over time, but some may pass out of housing of the information handling system. Because levels of ozone exposure to humans is limited for comfort and safety, substantial amounts of ozone emitting from the exhaust vent formed in the housing of the information handling system may need to be monitored. Ozone detectors may be added to the information handling system 100, but these devices are bulky, large, and expensive and the inclusion of an ozone detector within a housing of the information handling system 100 is not optimal.

The present specification describes an information handling system that includes a hardware processor, a memory device, and a power management unit (PMU) to provide power to the hardware processor and memory device. The information handling system further includes an ion emitter/collector cooling system including an ion emitter and an ion collector, the ion emitter to generate ions from the atmosphere and the ion collector to collect and deionize those ions, the creation of ions by the ion emitter creating an airflow through and out of the ion collector. The ion emitter/collector cooling system may be formed in a base chassis of a laptop-type information handling system. The information handling system also includes an intelligent ozone estimation and mitigation system executing on a hardware processor, hardware controller or other hardware processing resource and that includes at least one sensor to detect at least one indirect, non-static ozone predictor measurement describing ozone production at the ion emitter. The ozone estimation and mitigation system includes a trained ozone estimation machine learning model executable by the hardware processor to use, as input, the non-static ozone predictor measurement and provide, as output, an ozone estimation value estimating the amount of ozone produced at the ion emitter.

In an embodiment, the at least one sensor includes a power consumption sensor, an ion emitter and ion collector operating voltage sensor, a temperature sensor, and a humidity sensor, combinations thereof. Still further, the trained ozone estimation machine learning model may be trained with static ozone predictor variables of the ion emitter/collector cooling system that includes a distance between the emitter and collector, orientations of the information handling system during use, average distance from the user to an exhaust vent in the information handling system, size of the emitter compared to the size of the collector, or combinations thereof.

The ozone from the ion emitter/collector cooling system may be mitigated using an ozone mitigation system. When the ozone estimation value estimating the amount of ozone produced at the ion emitter/collector cooling system indicates that an ozone threshold limit has been reached, for example, mitigation actions may be conducted. For example, the ozone mitigation system may control an operating voltage and power provided to the ion emitter and ion collector to reduce the ozone created by the ion emitter/collector cooling system. In another example, a fan may be used to create supplemental airflow through a housing of the information handling system in addition to the airflow created by the ion emitter and ion collector and the ozone mitigation system to control an operating speed of the fan to dilute and disperse the amount of ozone created by the ion emitter/collector cooling system within the atmosphere when the ozone estimation value estimating the amount of ozone produced at the ion emitter/collector cooling system indicates that an ozone threshold limit has been reached. In another example embodiment, the ozone mitigation system may provide a message to be presented to the user of the information handling system indicating levels of ozone exceeding acceptable levels present when the ozone estimation value estimating the amount of ozone produced at the ion emitter/collector cooling system indicates that an ozone threshold limit has been reached.

FIG. 1 illustrates an information handling system 100 similar to information handling systems according to several aspects of the present disclosure that is operatively couplable to a cooling system formed within a housing of the information handling system. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of code instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of code instructions (sequential or otherwise) that specify actions to be taken by that machine. In an embodiment, the information handling system 100 may be operatively coupled to a server or other network device as well as with any wireless peripheral devices. Further, while a single information handling system 100 is illustrated, the term "system" shall also be taken to include any collection of systems or sub-systems that individually or jointly execute a set, or multiple sets, of code instructions to perform one or more computer functions.

The information handling system 100 may include memory (volatile (e.g., random-access memory, etc.), non-volatile (read-only memory, flash memory etc.) or any combination thereof), one or more hardware processing resources, such as a central processing unit (CPU), a graphics processing unit (GPU) 152, processing, hardware processor, hardware controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute code instructions for the one or more systems and modules described above, and operates to perform one or more of the methods described herein. For example, code instructions may be executed by a PMU controller or other hardware processing resource for an ion emitter/collector cooling system to control an intelligent ozone estimation and mitigation system of embodiments herein. The information handling system 100 may execute code instructions 110 via hardware processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include hardware processing resources such as a hardware processor 102, a central processing unit (CPU), accelerated processing unit (APU), a neural processing unit (NPU), a vision processing unit (VPU), an embedded controller (EC), a digital signal processor (DSP), a GPU 152, a microcontroller, or any other type of hardware processing device that executes code instructions to perform the processes described herein. Any of the hardware processing resources may operate to execute code that is either firmware or software code. Moreover, the information handling system 100 can include memory such as main memory 104, static memory 106, computer readable medium 108 storing code instructions 110 of, in an example embodiment, an ion emitter/collector cooling system (e.g., controlled by a power management unit (PMU) controller), or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system 100 to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the hardware processor 102 of the information handling system 100. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may include an ion emitter 156 and ion collector 158. The ion emitter 156 and ion collector 158 may be operatively coupled to an ionic driving circuit 160. According to embodiments herein, the ion emitter 156 may be operatively coupled to a positive electrode of a high voltage source of the ionic driving circuit 160. Additionally, the ion collector 158 may be operatively coupled to a negative electrode of the ionic driving circuit 160 or to a grounding source. The PMU 120 may provide the power to the ion emitter 156 and ion collector 158 via the ionic driving circuit 160 and the ionic driving circuit 160 may include circuitry such as a boost converter or step-up converter used to step up the voltage provided to the ion emitter 156. During operation of the ion emitter/collector cooling system 154, the ion emitter 156 may generate ions 172. In the context of the present specification, the term "emit", or "emitter" is meant to describe an action and device that, at its edges or other surfaces, creates ions 172 and, via an electromagnetic repulsion, repels those ions towards an attracting, oppositely charged source such as the ion collector 158 described herein. In an embodiment, the high voltage source of the ionic driving circuit 160 causes electrons to be ripped away from certain molecules such as gas molecules in the atmosphere thereby creating ions (e.g., positively charged ions or cations) at the edges or other surfaces of the ion emitter 156. This ionization process may include the removal of one or more electrons from the outer valence shells of the individual molecules within the gas such that they become positively charged (e.g., cation). In an example where the space between the ion emitter 156 and ion collector 158 includes atmospheric air, any number of types of gas molecules may be subjected to this process. For example, where the gas includes oxygen (O), the ionization of oxygen may include stripping an electron from molecules and forcing the removal of a single electron or a plurality of electrons from the oxygen molecule or molecule. This may lead to a $O^+$ or $O^{2+}$ ion (e.g., cation) being created by the ion emitter 156 and ionic driving circuit 160 in an embodiment. Other gas molecules/atoms within the atmosphere between the ion emitter 156 and ion collector 158 may similarly be ionized such as nitrogen, carbon dioxide, argon, hydrogen, etc. It is appreciated as well, that this ionization process may also cause ozone to be created. In this example embodiment, a single ionized oxygen molecule ($O_2$) may be attracted to and combine with an oxygen molecule ($O_2$) to form an ozone molecule ($O_3$). This ozone molecule has a slightly positive dipole moment causing the ozone molecule to be repelled from the ion emitter 156 and attracted to the ion collector 158. In an embodiment, the ozone molecules, along with the other ionized molecules and molecules, create a shearing force against the other molecules in the atmosphere between the ion emitter 156 and ion collector 158 thereby creating an airflow from the ion emitter 156 to the ion collector 158. In an embodiment, the ion collector 158 may be in the form of a thermal fin set that allows the airflow to pass through the ion collector 158 and out of the ion emitter/collector cooling system 154 and, further out of a housing of the information handling system 100 via, for example, and exhaust vent. In another embodiment, the airflow created by the ion emitter 156 and ion collector 158 may be passed to a fan 168 or other additional active cooling systems within the housing of the information handling system 100. Additionally, other passive cooling systems may be included and associated with the ion emitter 156 and ion collector 158 such as vapor chambers, heat pipes, and heat conductors.

As a result of the ion emitter 156 creating ozone within the housing of the information handling system 100 and using that ozone as an ion that creates a shear force on the other molecules in the atmosphere to create the airflow, some of this ozone may be accidentally expelled from the housing of the information handling system 100. The amount of ozone expelled may be estimated and mitigated via execution of the intelligent ozone estimation and mitigation system 162 described herein. The intelligent ozone estimation and mitigation system 162 may include a trained ozone estimation machine learning model 166 executable by the hardware processor 102 such as a central processing unit (CPU) and an ozone mitigation system 170. The execution of the trained ozone estimation machine learning model 166 by the hardware processor may identify an ozone estimation value estimating the amount of ozone produced at the ion emitter/collector cooling system 154 while the ozone mitigation system 170 causes a mitigation process to be conducted when the ozone estimation value estimating the amount of ozone produced at the ion emitter/collector cooling system indicates that an ozone threshold limit has been reached. In an embodiment, the ozone threshold limit may be set to an ozone level that is approved by, for example, a governmental entity such as the Occupational Safety and Health Administration (OSHA) in the United States. Other ozone threshold limits may be set such as ozone levels at or below 0.1 ppm over an eight-hour time frame or 0.2 ppm within a four-hour time frame and the like. In an embodiment, the ozone threshold limit may be set at an ozone level below those described herein in order to prevent ozone levels reaching those potentially unacceptable limitation levels.

In an embodiment, the trained ozone estimation machine learning model 166 may be trained prior to the user purchasing or receiving the information handling system 100. In an embodiment, the training of the trained ozone estimation machine learning model 166 may be completed via testing procedures conducted by the manufacturer and may be based on ozone detected by an ozone detector during these testing procedures. In an example embodiment, a plurality of static and non-static measurements are used to train an ozone estimation machine learning model remotely to get a trained ozone estimation machine learning model 166. In an example embodiment, a static variable that is used as input to train the trained ozone estimation machine learning model 166 includes a distance measurement between the ion emitter 156 and ion collector 158. As described herein, the ion emitter 156 generates charged ions that are attracted to the oppositely-charged ion collector 158. The distance between the ion emitter 156 and ion collector 158 not only define the strength of the electric field between the ion emitter 156 and ion collector 158, but may also define the speed at which the ions generated by the ion emitter 156 travel from the ion emitter 156 to the ion collector 158. Because of this distance, ozone created at the ion emitter 156 may travel faster across a shorter distance for example, and be expelled from the ion collector 158 quicker thereby increasing the amount of ozone at or near the user of the information handling system 100.

In an example embodiment, a static variable that is used as input to train the trained ozone estimation machine learning model 166 includes an orientation of the information handling system 100. In the example embodiments where the information handling system 100 is a laptop-type information handling system, the orientation may include a closed orientation, a laptop orientation, a tablet orientation, a dual tablet configuration, and a tent orientation. The close orientation is an orientation where the display portion of the laptop-type information handling system 100 is closed onto the base portion of the information handling system 100. The tablet configuration is an orientation where the information handling system is in a tablet form or where the base portion of the information handling system is made to flip behind the display portion. In a dual tablet configuration, the information handling system 100 may be made of a base portion that includes a separate base chassis display device along with the display device of the display portion of the information handling system or a single foldable display that may span both chassis of a dual-display information handling system 100. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent configuration, the display portion may be viewable to the user with the base portion in an orientation to prop up the display portion on a table, for example. These orientations may affect the accumulation of ozone at or near the user and may vary from information handling system 100 to information handling system 100 based on the size and shape of the housings of the base portions and display portions of the information handling system 100.

In an example embodiment, a static variable that is used as input to train the trained ozone estimation machine learning model 166 includes an average distance from the user to an exhaust vent where ozone may be expelled from out of the housing of the information handling system 100. This distance, again, may vary depending on the size and shape of the housings of the information handling system 100 as well as placement (e.g., a side or a back edge) of the exhaust vent. The average distance may be an anticipated range where the user may sit in front of the information handling system 100 to view, for example, the video display device 142 of the display chassis.

In an example embodiment, a static variable that is used as input to train the trained ozone estimation machine learning model 166 includes the size of the ion emitter 156 as compared to the size of the ion collector 158. As described herein, the ion emitter 156, when a high voltage source associated with the ionic driving circuit 160 is operatively coupled thereto, generate ions that include, among others, ozone. Any location, including sharp points, on the ion emitter 156 may be a source form which these ions can be created. The more surface area and sharp points on the ion emitter 156, the more ions are created resulting in the creation of more ozone during the ionization process described herein. Any combinations of these static variables may be used to train the trained ozone estimation machine learning model 166 described herein.

In an embodiment, non-static measurement variables, or measurements of those variables, may also be used to initially train the trained ozone estimation machine learning model 166 at, for example, the manufacturer of the information handling system 100. It is appreciated that these non-static measurement variables are used as input in the trained ozone estimation machine learning model 166 as well when the information handling system 100 is operated by the user. Data associated with these non-static measurement variables may be received using one or more of the sensors 164-1, 164-2, 164-3, 164-*n* described herein. In an example embodiment, non-static measurement variables that are used as input to train the trained ozone estimation machine learning model 166 includes data received from a power consumption sensor. Power consumption at the information handling system 100 may relate to the amount of heat generated by heat-generating hardware within the housing of the information handling system 100. This is because the amount of power used by, for example, the hardware processor 102 relates to the amount of heat produced by the hardware processor 102 and this similarly applies to other hardware operating within the information handling system 100.

In an example embodiment, non-static variable measurements that are used as input to train the trained ozone estimation machine learning model 166 includes an ion emitter 156 and ion collector 158 operating voltage obtained via an ion emitter 156 and ion collector 158 operating voltage sensor. As described herein, as the voltage difference between the ion emitter 156 and ion collector 158 creates a larger electric field between them as well as initiate the creation of ions on a relatively more rapid pace. Again, as the generation of ions at the ion emitter 156 increases, the instances of the creation of ozone also increases.

In an example embodiment, a non-static variable measurement that is used as input to train the trained ozone estimation machine learning model 166 includes data obtained from one or more temperature sensors placed at various locations within the information handling system 100 to monitor for temperatures within the housing of the information handling system 100. This includes temperature sensors at the heat-generating devices for which the ion emitter/collector cooling system 154 with its fan 168 and ion emitter 156/ion collector 158 are used to cool those devices. Again, an increase in heat may be indicative of an increase in power usage which results in an increase in the voltage applied to the ion emitter 156 and ion collector 158 to create the airflow used to cool these hardware devices as described herein.

In an example embodiment, a non-static variable measurement that is used as input to train the trained ozone estimation machine learning model 166 includes data obtained from one or more humidity sensors. In some embodiments, higher temperatures such as those detected within a housing of the information handling system 100 are generally associated with higher ozone levels while higher relative humidity are generally associated with lower ozone levels. In this example embodiment, current temperature and the humidity levels (e.g., within the housing or outside of the housing of the information handling system 100) may affect the levels of ozone production and presence.

During training of this trained ozone estimation machine learning model 166 at the manufacturers, an ozone detection sensor may be used to detect levels of ozone during operation of an information handling system 100. The levels of detected ozone may also be used as an input to the ozone estimation machine learning model in order to produce a trained ozone estimation machine learning model 166. As a result, experimental correlation between the non-static measurement variables and static variables relative to the ozone levels detected are used as input to the ozone estimation machine learning model being trained by the manufacturer. The ozone estimation machine learning model to be trained may include deep neural nets (DNNs), a Newton-Raphson function with a second order Taylor approximation (e.g., XGBoost® by the XGBoost Contributors), support vector regressions, along with other supervised and unsupervised machine learning models. As described herein, the ozone estimation machine learning model may receive, as input, the non-static measurement variables and static variables described herein to provide output and generate the trained ozone estimation machine learning model 166 used by the information handling system 100 to detect and mitigate ozone produced by the intelligent ozone estimation and mitigation system 162 as described herein.

In an embodiment, certain user scenarios may be used during this experimental correlation between the detected ozone levels and the non-static measurement variables and static variables. Among these user scenarios include what productivity levels the information handling system 100 is being operated at and what performance levels the information handling system 100 is being operated at among other scenarios. The ozone detected may be correlated with these scenarios and similarly used as input to train the ozone estimation machine learning model by the manufacturer. After training of the ozone estimation machine learning model, the manufacturer may provide the, now trained, trained ozone estimation machine learning model 166 as executable software for the hardware processor 102 to process as part of the intelligent ozone estimation and mitigation system 162 during use by the user. In an embodiment, an application specific integrated circuit (ASIC) may be created that includes this trained ozone estimation machine learning model 166. In an embodiment, the trained ozone estimation machine learning model 166 may be updated with any changes from other or additional experimental correlation of the detected ozone levels and the non-static measurement variables and static variables. These updated trained ozone estimation machine learning models 166 may be received by the information handling system 100 via, for example, a network connection used to transmit this data to the user's information handling system 100.

The hardware processor 102 such as a CPU or other hardware processing resources of an information handling system 100 may concurrently execute the trained ozone estimation machine learning model 166 during operation of the information handling system 100 by the user. As described herein, the static variables are input into or part of the trained ozone estimation machine learning model 166 without data being provided because these static variables were previously set based on the hardware of the information handling system 100. During operation, the CPU or other hardware processing resource of the information handling system 100 may execute the machine-readable program code associated with the trained ozone estimation machine learning model 166 while receiving data from the individual sensors 164-1, 164-2, 164-3, 164-n described herein that provide the non-static measurements as input to the trained ozone estimation machine learning model 166. This allows the information handling system 100 to be used to estimate the amount of ozone being produced by the ion emitter 156 and ion collector 158 of the ion emitter/collector cooling system 154 used to cool the heat-generating hardware within the housing of the information handling system 100. In an embodiment, an ozone threshold limit may be set to protect the comfort and safety of the user while using the information handling system 100. Again, in an embodiment, the ozone threshold limit may be set to an ozone level that is approved by, for example, a governmental entity such as the Occupational Safety and Health Administration (OSHA) in the United States. Other ozone threshold limits may be set such as ozone levels at or below 0.1 ppm over an eight-hour time frame or 0.2 ppm within a four-hour time frame and the like. In an embodiment, the ozone threshold limit may be set at an ozone level below those described herein in order to prevent ozone levels reaching those potentially unacceptable levels.

The intelligent ozone estimation and mitigation system 162 executing to control that ion emitter/collector cooling system 154 further includes an ozone mitigation system 170 used to mitigate the amount of ozone produced as well as warn the user of any health or safety issues that may arise from the production of ozone when the ozone threshold limit has been reached. The ozone mitigation system 170 may include that hardware and machine executable program code used to mitigate the creation and accumulation of ozone at the information handling system 100. In an embodiment, the ozone mitigation system 170 may do this by first determining if the ion emitter 156 and ion collector 158 are active and generating an airflow by the creation of ions as described herein. Where the ion emitter 156 is not generating ions, ozone cannot be created and the process ends with the CPU (e.g., hardware processor 102) monitoring for the activation of the ion emitter 156 and ion collector 158. Where the ion emitter 156 and ion collector 158 are activated as described herein, the process may begin to record the non-static measurements described herein via the intelligent ozone estimation and mitigation system 162 including temperature readings, power consumption readings, ion emitter 156 and ion collector 158 operating voltage sensor, and humidity sensor among other types of sensors 164-1, 164-1, 164-3, 164-n. As described herein, the trained ozone estimation machine learning model 166 of the intelligent ozone estimation and mitigation system 162 receives this input and provides, as output, a determination of whether the estimated ozone threshold level has been reached. Where it has not, the CPU (e.g., hardware processor 102) may continue to execute the trained ozone estimation machine learning model 166 to determine if and when the ozone threshold level has been reached.

Where the execution of the trained ozone estimation machine learning model 166 indicates that the estimated ozone threshold level has been reached or exceeded, the ozone mitigation system 170 may initiate a number of ozone mitigation processes to reduce the amount of ozone at or near the information handling system 100 and created by the ion emitter 156 and ion collector 158. In an embodiment, the ozone mitigation system 170 may determine if the information handling system 100 includes a fan 168 that, along with the airflow created by operation of the ion emitter 156 and ion collector 158, causes an airflow to be passed over heat-generating hardware (e.g., CPU or other hardware processing devices) to direct that heated air out of an exhaust vent formed in the housing of the information handling system 100.

Where the information handling system 100 does not include a fan 168, the process of the ozone mitigation system 170 may proceed with reducing the voltage applied to the ion emitter 156/ion collector 158 thereby reducing the levels of ions created and potentially the amount of airflow created by the ion emitter 156/ion collector 158 driven by the ionic driving circuit 160. In an embodiment, the power used to execute the applications by the hardware processor 102 is also reduced, background applications may be paused or terminated, and other processes may be terminated to reduce the amount of heat produced by, for example, the CPU of the information handling system 100.

Where the information handling system 100 does include a fan 168, the ozone mitigation system 170 may activate the fan 168, if not already. Where the fan 168 is already in operation, the ozone mitigation system 170 may increase the speed of the fan 168 in order to create more airflow through the housing of the information handling system. In an embodiment, the ozone estimation provided via execution of the trained ozone estimation machine learning model 166 of the intelligent ozone estimation and mitigation system 162 may determine if the fan 168 is to be operated, how fast the fan 168 speed is to be increased or decreased, and to what degree the voltage applied to the ion emitter 156/ion collector 158 is to be reduced in order to reduce the amount of ions created and the amount of airflow created by the ion emitter 156/ion collector 158 driven by the ionic driving circuit 160. In this example embodiment, where a threshold ozone limit has been reached, the operation of the ion emitter 156/ion collector 158 may be reduced (e.g., voltage applied to ion emitter 156/ion collector 158 is reduced) while the operation of the fan 168 is increased. In an embodiment, multiple ozone threshold limits may be used to dictate, in a stepped fashion, to what degree the operation of the ion emitter 156/ion collector 158 may be reduced (e.g., voltage applied to ion emitter 156/ion collector 158 is reduced) while the operation of the fan 168 is increased.

In an example embodiment, the fan 168 may be operated at maximum speeds to create airflow. The process may determine whether the fan 168 is at a maximum operation speed and, if so, the ozone mitigation system 170 may reduce the operation of the ion emitter 156/ion collector 158 (e.g., voltage applied to ion emitter 156/ion collector 158 is reduced) while the power used to execute the applications by the hardware processor 102 is also reduced, background applications may be paused or terminated, and other processes may be terminated to reduce the amount of heat produced by, for example, the CPU of the information handling system 100.

In an embodiment, the ozone mitigation system 170 may also provide output to a user indicating that an ozone threshold limit has been reached. This output may include an alarm in an example embodiment. In another embodiment, the ozone mitigation system 170 may provide a visual message to the user via the video display device 142 indicating that an ozone threshold limit has been reached and that other mitigating actions are being conducted to limit the ozone level. In an embodiment, this message may indicate ozone levels estimated by the trained ozone estimation machine learning model 166 and notify the user of potential health risks involved with breathing in ozone.

The training of the ozone estimation machine learning model 166 of the intelligent ozone estimation and mitigation system 162 may occur remotely. Then, the execution of the trained ozone estimation machine learning model 166 by a hardware processor 102 of the information handling system 100 allows for the estimation and mitigation of ozone creation by the ion emitter 156/ion collector 158 without the use of large and expensive ozone detectors being placed within the housing of the information handling system 100. The systems and methods described herein also provides for the mitigation of ozone levels by the intelligent ozone estimation and mitigation system 162 using the operating characteristics of the information handling system 100 via the mitigation processes described herein. The ozone mitigation system 170 may mitigate estimated ozone levels with mitigation processes including the use of a fan 168, terminating applications being executed, notifying the user, and, if necessary, where the ozone levels are too high (e.g., significantly above the threshold ozone limit), or by shutting down the information handling system 100 is shut down in order to protect the comfort and safety of the user.

The information handling system 100 can include one or more set of code instructions 110 that can be executed to cause the computer system to perform any one or more of the methods or computer-based functions disclosed herein. For example, code instructions 110 may execute various software applications, software agents, a basic input/output system (BIOS) 112 firmware and/or software, or other aspects or components. Code instructions 110 may execute an ion emitter 156/ion collector 158 to control various aspects of the ion emitter 156/ion collector 158 as a cooling system of the embodiments herein. Various software modules comprising application code instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of code instructions 110 such as software can be embedded to be executed by the hardware processor 102 or other processing devices such as a GPU 152 or hardware controllers to perform the processes described herein. Similarly, main memory 104 and static memory 106 may also contain a computer-readable medium for storage of one or more sets of code instructions, parameters, or profiles 110 described herein. The disk drive unit 118 or static memory 106 also contain space for data storage. Further, the code instructions 110 may embody one or more of the methods as described herein. In a particular embodiment, the code instructions, parameters, and profiles 110 may reside completely, or at least partially, within the main memory 104, the static memory 106, and/or within the disk drive 118 during execution by the hardware processor 102 or GPU 152 of information handling system 100. The main memory 104, GPU 152, and the hardware processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of code instructions. The term "computer-readable medium" shall also include any medium that is capable of storing, encoding, or carrying a set of code instructions for execution by a hardware processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may include a hardware controller and executable code instructions to manage the power provided to the components of the information handling system 100 such as the hardware processor 102, and manage control of the ion emitter/controller cooling system 154 that includes the ionic driving circuit 160, the ion emitter 156, and the ion collector 158, along with other hardware. The PMU 120 may control power to one or more components including the ion emitter 156, the ion collector 158, the ionic driving circuit 166, one or more drive units 118, the hardware processor 102 (e.g., CPU), the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels or temperature via thermistors and be electrically coupled, either wired or wirelessly, to the information handling system 100 to provide this power and coupled to bus 116 to provide or receive data or code instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed. PMU 120 may include a hardware controller to execute code instructions 110 of an ionic emitter/collector or a cooling fan control system to control the ion emitter 156, ion collector 158, and ionic driving circuit 160, along with the rotational speed of the fan 168 based on estimated ozone threshold limits according to some embodiments of the present disclosure.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software or firmware executing as hardware processing resources, and hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The hardware device, controller, or module can execute code instructions of software, including firmware embedded at a device, such as an Intel® Core class processor, ARM® brand processors, Qualcomm @Snapdragon processors, or other hardware processors and chipsets, or other such device, or software capable of operating a relevant environment of the information handling system. The system, device, or module can also include a combination of the foregoing examples of hardware or hardware executing software. Note that an information handling system can include an integrated circuit or a board-level product having portions thereof that can also be any combination of hardware and hardware executing software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
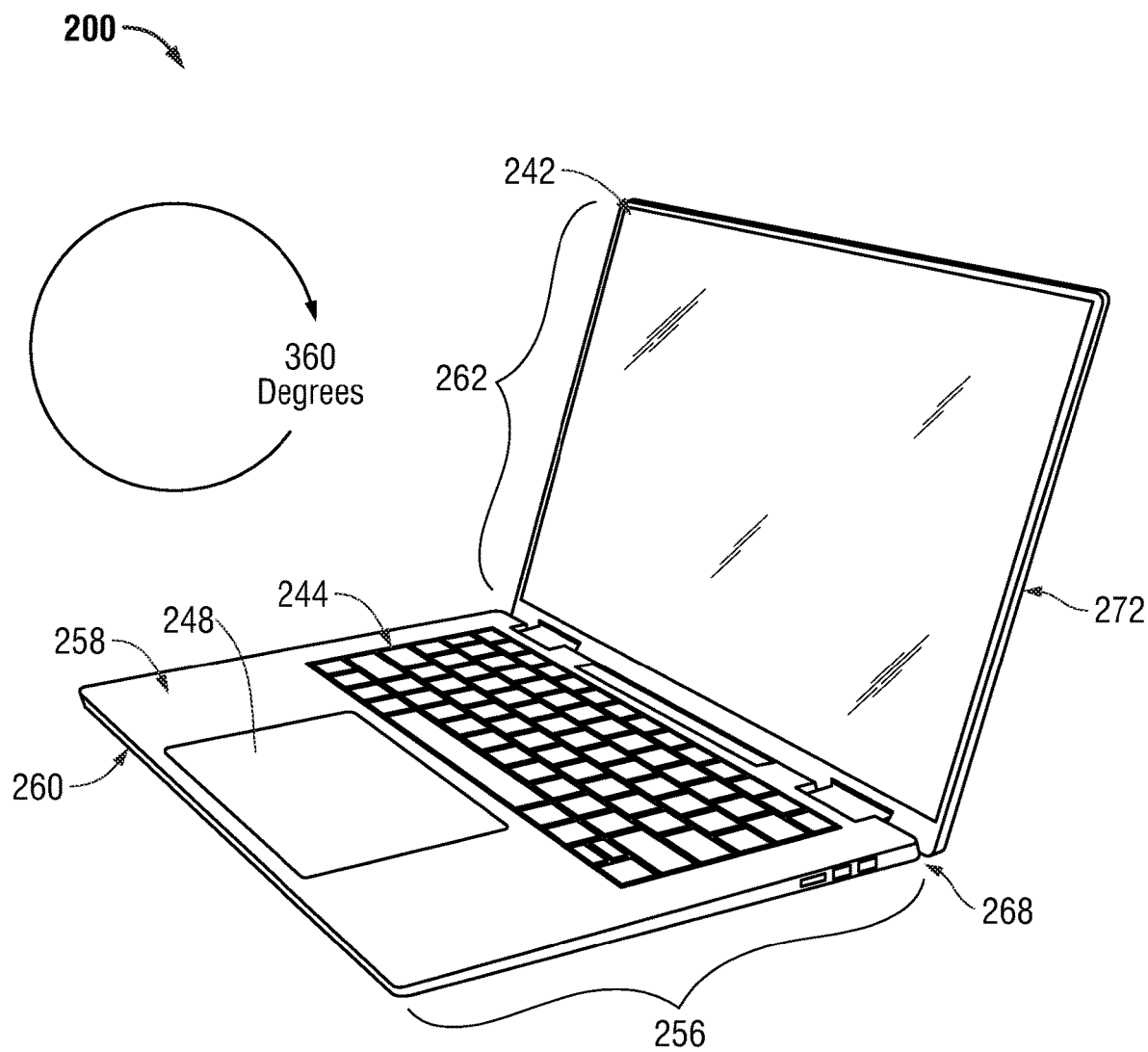
FIG. 2 is a graphic diagram of a laptop type information handling system housing an ion emitter/collector cooling system and an intelligent ozone estimation and mitigation system according to an embodiment of the present disclosure.

FIG. 2 is a graphic diagram of an information handling system 200 housing an ion emitter/ion collector cooling system and intelligent ozone estimation and mitigation system according to an embodiment of the present disclosure. The information handling system 200 may, in example embodiments, be a laptop-type information handling system 200. In the example shown in FIG. 2, the information handling system 200 may be a 360° information handling system 200 where an exterior surface of the d-cover 260 or bottom cover of a base chassis 256 may be brought towards an exterior side of the a-cover 272 or back display cover of the display chassis 262 to place the information handling system 200 in a tablet configuration in one embodiment. As shown in FIG. 2, the information handling system 200 may also be placed in a laptop configuration as shown in FIG. 2 where the base chassis 256 is lying flat on a surface with the display chassis 262 being placed upright from the base chassis 256. Other configurations such as a dual tablet configuration and a tent orientation are contemplated as described herein.

As described herein, the information handling system 200 may include a plurality of chassis parts made of metal, plastic, or the like. The information handling system 200, in an embodiment, may comprise an outer case or shell of an information handling system 200 for housing internal components of the information handling system 200, such as a video display device, a cursor control device, and an alpha numeric input device (e.g., keyboard 244). As shown in FIG. 2, the information handling system 200 may include a video display device/b-cover 242 which may include a bezel functioning to enclose the video display chassis 262 with the a-cover or back display cover 270 described herein. As another example, the information handling system 200 may further include the c-cover 258 or top cover of the base chassis 256 functioning to enclose a cursor control device such as a trackpad 248 and/or a keyboard 244 acting as an alpha numeric input device. The a-cover 270 or back display cover and the video display device/b-cover 242 may be joined together in an embodiment to form a fully enclosed display chassis 262, while the c-cover 258 or top cover and the d-cover 260 or bottom cover may be joined together to form a fully enclosed base chassis 256. Taking a closed configuration as a reference position of the display chassis 262 including the a-cover 270 and the video display device/b-cover 242 and the base chassis 256 including the c-cover 258 and the d-cover 260, the display chassis 262 including the a-cover 270 and the video display device/b-cover 242 may be rotated away from the base chassis 256 into the laptop configuration as shown in FIG. 2.

As described herein, an exhaust vent, such as the rear exhaust vent (not shown) may be formed. For example, a rear exhaust vent may be formed on a rear surface where the d-cover 260 and c-cover 258 are coupled together. Exhaust vents may be formed on side, in the c-cover 258, or in the bottom, d-cover 260 or elsewhere in other embodiments. Additionally, the base chassis 256 may be operatively coupled to a display chassis 262 via a hinge 264. In an embodiment, this hinge 264 may be a drop-down hinge that drops the display chassis 262 down as the display chassis 262 or other hinge types is placed in an open position as shown. This configuration of the information handling system may be detected and used as input for the trained ozone estimation machine learning model of the ion emitter/collector cooling system as described herein in connection with FIG. 1 along with the static variable of the hinge type of information handling system 200 which may affect ozone accumulation near the user. An average distance of a user from the information handling system 200 is also used as input for the trained ozone estimation machine learning model and may depend on which orientation the information handling system is placed in while in use. Still further a relative humidity around the information handling system is further used as input for the trained ozone estimation machine learning model as described herein. As static variables used as input for the information handling system, the size, shape, and physical layout of the hardware associated with the information handling system including the placement of the ion emitter/ion collector and fan (if available) within the base chassis 256 type of hinge, and location of the exhaust vent may all be used in an initial training of the ozone estimation machine learning model at the manufacturers. Other non-static measurement or variable values used as input into the, now, trained ozone estimation machine learning model may be dependent on the usage characteristics of the information handling system as well as the use scenarios as described in connection with FIG. 1.

The intelligent ozone estimation and mitigation system described herein includes the trained ozone estimation machine learning model executable by the hardware processing resource such as a CPU housed within the base chassis 256. The intelligent ozone estimation and mitigation system further includes an ozone mitigation system executable by the CPU. The execution of the trained ozone estimation machine learning model by the hardware processor may identify an ozone estimation value estimating the amount of ozone produced at the ion emitter/ion collector cooling system while the ozone mitigation system causes a mitigation process to be conducted when the ozone estimation value estimating the amount of ozone produced at the ion emitter/ion collector indicates that an ozone threshold limit has been reached. In an embodiment, the ozone threshold limit may be set to an ozone level that is approved by, for example, a governmental entity such as the OSHA in the United States. Other ozone threshold limits may be set such as ozone levels at or below 0.1 ppm over an eight-hour time frame or 0.2 ppm within a four-hour time frame and the like.

In an embodiment, the ozone threshold limit may be set at an ozone level below those described herein in order to prevent ozone levels reaching those potentially unacceptable levels.

As described herein, the static measurement variables or other variable values are input into or already part of the trained ozone estimation machine learning model without data being provided because these static variables were previously set based on the hardware of the information handling system 200. During operation, the CPU of the information handling system 200 may execute the machine-readable program code associated with the trained ozone estimation machine learning model while receiving data from the individual sensors described herein that provide the non-static measurement variables or other variable values as input to the trained ozone estimation machine learning model. This allows the information handling system 200 to be used to estimate the amount of ozone being produced by the ion emitter and ion collector used to cool the heat-generating hardware within the housing of the information handling system 200.

The ion emitter/collector cooling system further includes an ozone mitigation system used to mitigate the amount of ozone produced as well as warn the user of any health or safety issues that may arise from the production of ozone when the ozone threshold limit has been reached. The ozone mitigation system may include that hardware and machine executable program code used to mitigate the creation and accumulation of ozone at the information handling system 200. In an embodiment, the ozone mitigation system may do this by first determining if the ion emitter and ion collector are active and generating an airflow by the creation of ions as described herein. Where the ion emitter is not generating ions, ozone cannot be created and the process ends with the CPU (e.g., hardware processor) monitoring for the activation of the ion emitter and ion collector. As described herein, during creation of the ions by the ion emitter, oxygen molecules may be stripped of one or more electrons. These ionized oxygen molecules (e.g., $O^+$, $O^{+2}$) may combine with other oxygen molecules including oxygen molecules (e.g., $O_2$) to form ozone. This ozone formation process may be dependent on those non-static measurement variables or other variable values described herein including, but not limited to, the relative humidity, temperatures, and the voltage levels applied to the ion emitter (e.g., higher voltages may create more ions such as $O^+$, $O^{+2}$ leading to the creation of more ozone).

Where the ion emitter and ion collector are activated as described herein, the process may begin to record the non-static measurement variables or other variable values described herein including temperature readings, power consumption readings, ion emitter and ion collector operating voltage sensor, and humidity sensor among other types of sensors. As described herein, the trained ozone estimation machine learning model receives this input and provides, as output, a determination of whether the estimated ozone threshold level has been reached. Where it has not, the CPU (e.g., hardware processor) may continue to execute the trained ozone estimation machine learning model to determine if and when the ozone threshold level has been reached.

Where the execution of the trained ozone estimation machine learning model indicates that the estimated ozone threshold level has been reached or exceeded, the ozone mitigation system may initiate a number of ozone mitigation processes to reduce the amount of ozone at or near the information handling system 200 and created by the ion emitter and ion collector. In an embodiment, the ozone mitigation system may determine if the information handling system 200 includes a fan that, along with the airflow created by operation of the ion emitter and ion collector, causes an airflow to be passed over heat-generating hardware (e.g., CPU or other hardware processing devices) to direct that heated air out of the ion emitter/collector cooling system and further, out of an exhaust vent formed in the housing of the information handling system 200 in some embodiments.

Where the information handling system 200 does not include a fan, the process may proceed with reducing the voltage applied to the ion emitter/ion collector thereby reducing the level of ions created and potentially the amount of airflow created by the ion emitter/ion collector driven by the ionic driving circuit. In an embodiment, the power used to execute the applications by the hardware processor is also reduced, background applications may be paused or terminated, and other processes may be terminated to reduce the amount of heat produced by, for example, the CPU of the information handling system 200.

Where the information handling system 200 does include a fan, the ozone mitigation system may activate the fan, if not already. Where the fan is already in operation, the ozone mitigation system may increase the speed of the fan in order to create more airflow through the housing of the information handling system 200. In an embodiment, the estimated ozone readings provided via execution of the trained ozone estimation machine learning model may determine if the fan is to be operated, how fast the fan speed is to be increased or decreased, and to what degree the voltage applied to the ion emitter/ion collector is to be reduced in order to reduce the level of ions created and the amount of airflow created by the ion emitter/ion collector driven by the ionic driving circuit. In this example embodiment, where a threshold ozone limit has been reached, the operation of the ion emitter/ion collector may be reduced (e.g., voltage applied to ion emitter/ion collector is reduced) while the operation of the fan is increased. In an embodiment, multiple ozone threshold limits may be used to dictate, in a stepped fashion, to what degree the operation of the ion emitter/ion collector may be reduced (e.g., voltage applied to ion emitter/ion collector is reduced) while the operation of the fan is increased.

In an example embodiment, the fan may be operated at maximum speeds to create airflow. The process may determine whether the fan is at a maximum operation speed and, if so, the ozone mitigation system may reduce the operation of the ion emitter/ion collector (e.g., voltage applied to ion emitter/ion collector is reduced) while the power used to execute the applications by the hardware processor is also reduced, background applications may be paused or terminated, and other processes may be terminated to reduce the amount of heat produced by, for example, the CPU of the information handling system 200.

In an embodiment, the ozone mitigation system may also provide output to a user indicating that an ozone threshold limit has been reached. This output may include an alarm in an example embodiment. In another embodiment, the ozone mitigation system may provide a visual message to the user via the video display device 242 indicating that an ozone threshold limit has been reached and that other mitigating actions are being conducted to limit the ozone level. In an embodiment, this message may indicate ozone levels estimated by the trained ozone estimation machine learning model and notify the user of potential health risks or discomfort involved with breathing in ozone.

The training of the ozone estimation machine learning model and execution of the trained ozone estimation machine learning model by a hardware processor of the information handling system 200 allows for the estimation and mitigation of ozone creation by the ion emitter/ion collector without the use of large and expensive ozone detectors being placed within the housing of the information handling system 200. The systems and methods described herein also provides for the mitigation of ozone levels using the operating characteristics of the information handling system 200 via the mitigation processes described herein including the use of a fan, terminating applications being executed, notifying the user, and, if necessary where the ozone levels are too high (e.g., significantly above the threshold ozone limit), the information handling system 200 is shut down in order to protect the health and safety of the user.

Figure 3:
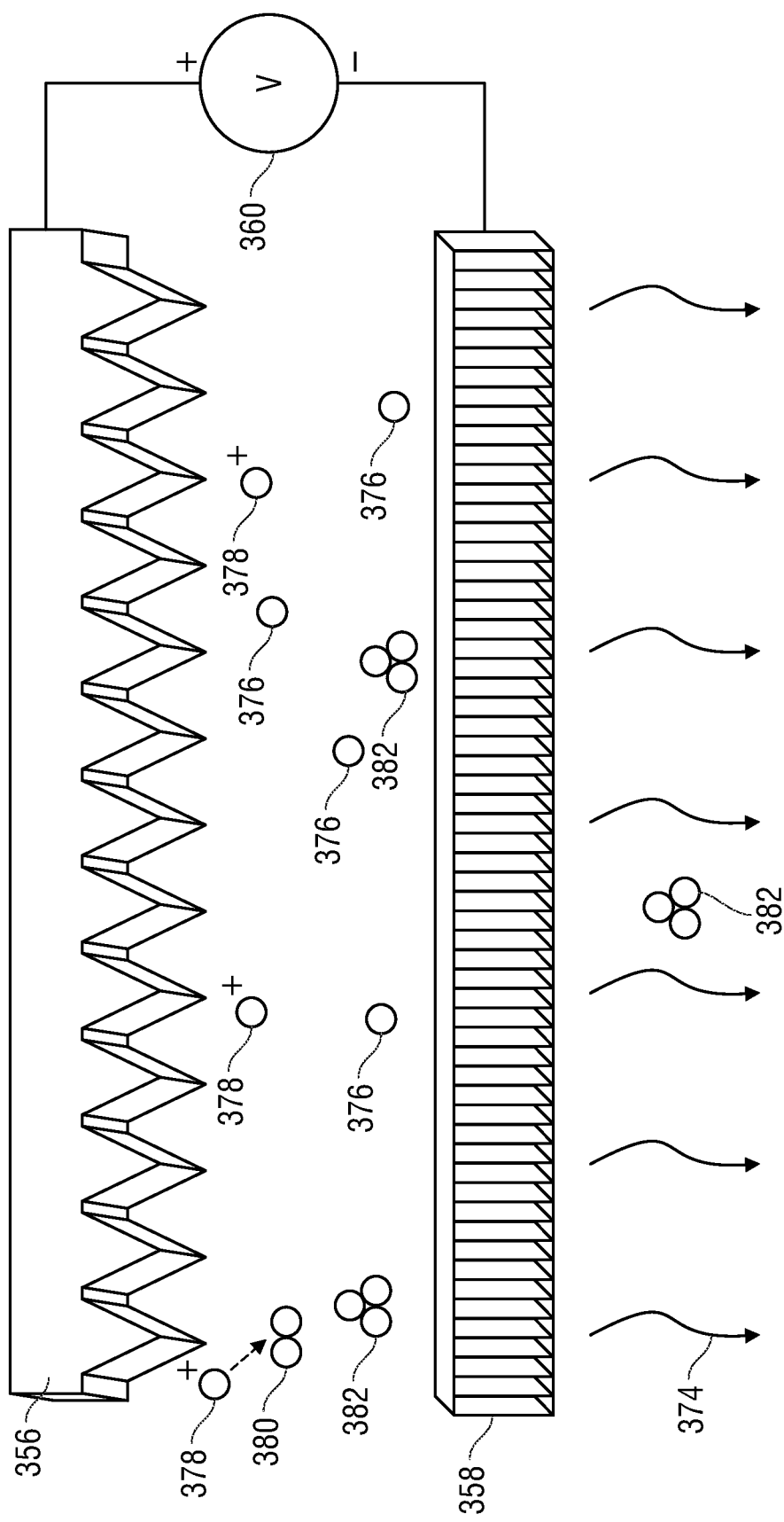
FIG. 3 is a graphic diagram of an ion emitter and ion collector as part of an ion emitter/collector cooling system formed within a chassis of an information handling system and operatively coupled to an intelligent ozone estimation and mitigation system in an embodiment of the present disclosure.

FIG. 3 is a graphic diagram of an ion emitter 356 and ion collector 358 as part of a cooling system formed within a chassis of an information handling system and managed by an intelligent ozone estimation and mitigation system in an embodiment of the present disclosure. As described herein, the ion emitter 356 and ion collector 358 may be operatively coupled to an ionic driving circuit 360. The ionic driving circuit 360 includes a high voltage source used to create the electric field created between the ion emitter 356 and ion collector 358. As shown in FIG. 3, the ion emitter 356 is operatively coupled to a positive electrode of the ionic driving circuit 360 and the ion collector 358 is operatively coupled to a negative electrode of the ionic driving circuit 360. In an embodiment, the ion collector 358 may be operatively coupled to ground instead of the negative electrode of the ionic driving circuit 360.

As described herein, as the high voltage from the high voltage source of the ionic driving circuit 360 is applied to the ion emitter 356, an electric field is created between the ion emitter 356 and ion collector 358. Additionally, the ion emitter 356 begins to ionize the molecules 376 within the atmospheric air between the ion emitter 356 and ion collector 358 to create ions. In an example embodiment, the charged ions 378 created are positively charged ions 378. These may include positively charged ions 378 of nitrogen (N), oxygen (O), carbon dioxide and other gas molecules. In the case of the ionization of oxygen, an amount of ozone may be created as a byproduct of this ionization process by the ion emitter 356. The process may include the ionization of an oxygen molecule resulting in a charged oxygen ion 378. This ionization of the oxygen molecules may separate the oxygen molecules from each other while stripping one or more electrons form the valence electron shells of the oxygen molecules and molecules. These single, ionized oxygen molecules (e.g., charged ion 378) may pass from the ion emitter 356 to the ion collector 358 due to the repulsive force of the ion emitter 356 on the positively-charged oxygen molecule and attractive force of the ion collector 358 on the positively-charged oxygen molecule. As the ionized oxygen molecule passes through this atmosphere, it may come into contact with an oxygen molecule 380 (e.g., $O_2$; dioxygen). Because of the positive charge associated with the ionized oxygen molecule, the positively charged oxygen ion 378 may react with the oxygen molecule 380 to form ozone 382. Again, the rate of this formation of the ozone 382 molecules may depend on those non-static measurement variables or other variable values used by the trained ozone estimation machine learning model to estimate the amount of ozone created by the ion emitter 356 and ion collector 358 such as the temperature within the housing of the information handling system (e.g., base chassis), the relative humidity, and the voltage applied to the ion emitter 356/ion collector 358 creating the electric field and distance between the ion emitter 356 and ion collector 358. Some of the ozone 382 molecules may degrade within the area between the ion emitter 356 and ion collector 358. However, some ozone 382 molecules may pass through the ion collector 358 that may include a series of thermal fins and spaces that allow the airflow 374 to pass therethrough. These ozone 382 molecules may pass through a portion of the housing of the information handling system and some portion out of an exhaust vent formed in that housing. At this point the ozone 382 molecules have the potential to accumulate and increase in parts per million (ppm). The trained ozone estimation machine learning model described herein estimates the amount of ozone 382 molecules that exit the housing and, when an ozone 382 threshold level is reached, an ozone mitigation system is executed by the hardware processor to mitigate the amount of ozone 382 generated and expelled out of the housing or to increase disposal of the ozone from the information handling system.

As described herein, the cooling system of the information handling system may further include a fan. The fan may be placed downstream from the airflow 374 emitted out of the ion collector 358 and supplement the airflow created by the operation of the ion emitter 356 and ion collector 358. As described herein, the speed of the fan may be increased or decreased based upon the mitigation processes initiated via execution of the ozone mitigation system.

Figure 4:
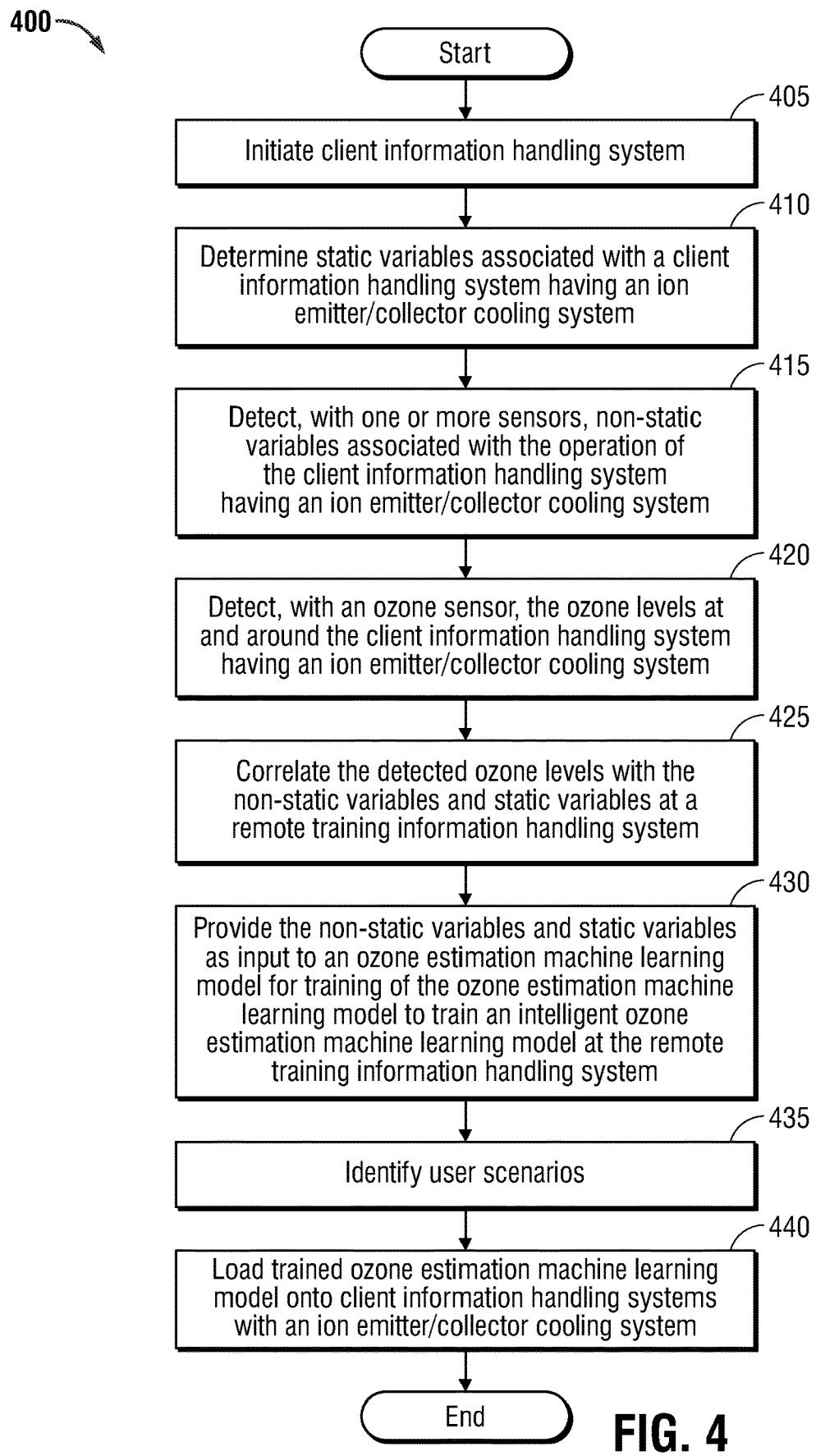
FIG. 4 is a flow diagram of a method of training an intelligent ozone estimation machine learning model for execution by a hardware processor of an information handling system according to an embodiment of the present disclosure.

FIG. 4 is a flow diagram of a method 400 of developing a trained ozone estimation machine learning model for execution by a hardware processor of remote training information handling system according to an embodiment of the present disclosure. The method 400 includes, at block 405 with initiating the client information handling system which may be coupled via a network to the remote server information handling system used to train the ozone estimation machine learning model. This initiation process may be conducted by the user, information technology manager, or manufacturer actuating, for example, a power key on the client information handling system. The training may occur for one example client information handling system in an embodiment, and then be applied to all similar client information handling systems with similar hardware components and configurations. The actuation of this power key may cause the execution of a native BIOS, a native OS, or other code instructions used and executed by the hardware processor of the client information handling system to operate the hardware within the client information handling system including the enclosed ion emitter cooling system described herein. In an embodiment, the initiation of the client information handling system may further include an initiation of a hardware controller, a PMU controller, or hardware processor to execute code instructions of an ion emitter control system to control an ionic driving circuit for the enclosed ion emitter cooling system described herein.

The method 400 continues to block 410 with determining those static measurement variables or variable values, referred to as static variables, associated with the information handling system. In an example embodiment, a static variable that is used as input to train the trained ozone estimation machine learning model at the remote training server information handling system includes a distance measurement between the ion emitter and ion collector. As described herein, the ion emitter generates charged ions that are attracted to the oppositely-charged ion collector. The distance between the ion emitter and ion collector may not only define the strength of the electric field between the ion emitter and ion collector, but may also define the speed at which the ions generated by the ion emitter travel from the ion emitter to the ion collector. Because of this distance, ozone created at the ion emitter may travel faster and be expelled from the ion collector quicker thereby increasing the amount of ozone at or near the user of the information handling system.

In an example embodiment, a static variable that is used as input to train the trained ozone estimation machine learning model at a remote training information handling system includes an orientation of the client information handling system although detection from among a plurality static orientations may be detected and be a non-static variable value. In the example embodiments where the client information handling system is a laptop-type information handling system, the orientation may include a closed orientation, a laptop orientation, a tablet orientation, a dual tablet configuration, and a tent orientation. The closed orientation is an orientation where the display portion of the laptop-type information handling system is closed onto the base portion of the client information handling system. The tablet configuration is an orientation where the client information handling system is in a tablet form or where the base portion of the client information handling system is made to flip behind the display portion. In a dual tablet configuration, the client information handling system may be made of a base portion that includes a separate base chassis display device along with the display device of the display portion of the client information handling system or a single foldable display that may span both chassis of a dual-display information handling system. In this dual tablet configuration, the base portion and display portion are laid open to reveal both display devices or an entire foldable display to the user. In a laptop configuration, the client information handling system may have the base portion on a table or on the user's lap with the display portion upright and viewable to the user. In a tent configuration, the display portion may be viewable to the user with the base portion in an orientation to prop up the display portion on a table, for example. These orientations selected, may be a static variable based on distances and locations of exhaust vents to a user in each orientation. These orientations each affect the accumulation of ozone at or near the user differently and may vary from client information handling system to client information handling system based on the size and shape of the housings of the base portions and display portions of the client information handling system.

In an example embodiment, a static variable that is used as input to train the trained ozone estimation machine learning model at a remote location includes an average distance from the user to an exhaust vent where ozone may be expelled from out of the housing of the client information handling system. This distance, again, may vary depending on the size and shape of the housings of the client information handling system as well as placement (e.g., a side or a back edge) of the exhaust vent. The average distance may be an anticipated range where the user may sit in front of the client information handling system to view, for example, the video display device of the display chassis.

In an example embodiment, a static variable that is used as input to train the trained ozone estimation machine learning model includes the size of the ion emitter as compared to the size of the ion collector. As described herein, the ion emitter, when a high voltage source associated with the ionic driving circuit is operatively coupled thereto, generate ions that include, among others, ozone.

Any location, including sharp points, on the ion emitter may be a source form which these ions can be created. The more surface area and sharp points on the ion emitter, the more ions are created resulting in the creation of more ozone during the ionization process described herein. Any combinations of these static variables or others may be used to train the trained ozone estimation machine learning model described herein.

The method 400 further includes, at block 415, detecting and measuring, within one or more sensors, non-static measurement variables or variable values, also referred to as non-static variables, associated with the operation of the client information handling system. In an embodiment, non-static variables may also be used to initially train the trained ozone estimation machine learning model at, for example, the manufacturer of the client information handling system. It is appreciated that these non-static variables are used as input in the trained ozone estimation machine learning model when the client information handling system is operated by the user. Data associated with these non-static variables may be received using one or more of the sensors described herein. In an example embodiment, a non-static variable that is used as input to train the trained ozone estimation machine learning model includes data received from a power consumption sensor. Power consumption at the information handling system may relate to the amount of heat generated by heat-generating hardware within the housing of the client information handling system. This is because the amount of power used by, for example, the hardware processor relates to the amount of heat produced by the hardware processor, and this similarly applies to other hardware operating within the client information handling system.

In an example embodiment, a non-static variable that is used as input to train the trained ozone estimation machine learning model includes an ion emitter and ion collector operating voltage obtained via an ion emitter and ion collector operating voltage sensor. As described herein, as the voltage difference between the ion emitter and ion collector creates a larger electric field between them as well as initiates the creation of ions on a relatively more rapid pace. Again, as the generation of ions at the ion emitter increases, the instances of the creation of ozone also increases.

In an example embodiment, a non-static variable that is used as input to train the trained ozone estimation machine learning model includes data obtained from one or more temperature sensors placed at various locations within the client information handling system to monitor for temperatures within the housing of the information handling system. This includes temperature sensors at the heat-generating devices for which the ion emitter/collector cooling system with its ion emitter/ion collector and, optionally, fan are used to cool those devices. Again, an increase in heat may be indicative of an increase in power usage which results in an increase in the voltage applied to the ion emitter and ion collector to create the airflow used to cool these hardware devices as described herein.

In an example embodiment, a non-static variable that is used as input to train the trained ozone estimation machine learning model includes data obtained from one or more humidity sensors. In some embodiments, higher temperatures such as those detected within a housing of the client information handling system are generally associated with higher ozone levels while higher relative humidity are generally associated with lower ozone levels. In this example embodiment, current temperature and the humidity levels (e.g., within the housing or outside of the housing of the information handling system) may affect the levels of ozone production and presence.

The method 400 further includes, at block 420, with detecting ozone levels at and around the client information handling system or an example client information handling system configuration using an ozone sensor. As described herein, this process is conducted by a manufacturer or agent of the manufacturer to determine the actual ozone levels during operation of any given type or model of client information handling system that includes an ion emitter and ion collector. This allows the manufacturer to determine the actual ozone levels under operating conditions of the type or model client information handling system so that the ozone estimation machine learning model can be properly trained.

The method 400 further includes, at block 425, with the manufacturer correlating the detected ozone levels with the non-static variables and the static variables. This correlation indicates that, under certain operating processes and scenarios of the client information handling system, the detected ozone levels can be expected.

The method 400 further includes providing, at block 430, the non-static variables and static variables as input to the ozone estimation machine learning model for training of the ozone estimation machine learning model at the remote training information handling server. During training of this ozone estimation machine learning model, the levels of detected ozone may also be used as an input to the ozone estimation machine learning model in order to produce a trained ozone estimation machine learning model. As a result, experimental correlation between the non-static variables and static variables relative to the ozone levels detected are used as input to the ozone estimation machine learning model being trained at the manufacturer. The ozone estimation machine learning model to be trained may include deep neural nets (DNNs), a Newton-Raphson function with a second order Taylor approximation (e.g., XGBoost® by the XGBoost Contributors), support vector regressions, along with other supervised and unsupervised machine learning models. As described herein, the ozone estimation machine learning model may receive, as input, the non-static and static variables described herein to provide output and generate the trained ozone estimation machine learning model used by the manufacturer client information handling system to detect and mitigate ozone produced by the intelligent ozone estimation and mitigation system as described herein.

The method 400 further includes, at block 435, identifying user scenarios at which the information handling may be operated at. In an embodiment, certain user scenarios may be used during this experimental correlation between the detected ozone levels and the non-static variables and static variables at the remote training information handling system. Among these user scenarios include what productivity levels the client information handling system may be operated at and what performance levels the client information handling system is being operated at among other scenarios. The ozone detected may be correlated with these scenarios and similarly used as input to train the ozone estimation machine learning model by the manufacturer.

After training of the ozone estimation machine learning model, the method 400 may include, at block 440 providing the, now trained, trained ozone estimation machine learning model as executable software for the hardware processor to process during use of a client information handling system of a matching model and type with a similar configuration by a user. In some embodiments, an application specific integrated circuit (ASIC) may be created that includes this trained ozone estimation machine learning model. In an embodiment, the trained ozone estimation machine learning model may be updated with any changes from other or additional experimental correlation of the detected ozone levels and the non-static variables and static variables. These updated trained ozone estimation machine learning models may be received by the client information handling system via, for example, a network connection used to transmit this data to the user's client information handling system. At this point, the creation of the trained ozone estimation machine learning model for the intelligent ozone estimation and mitigation system may end here.

Figure 5:
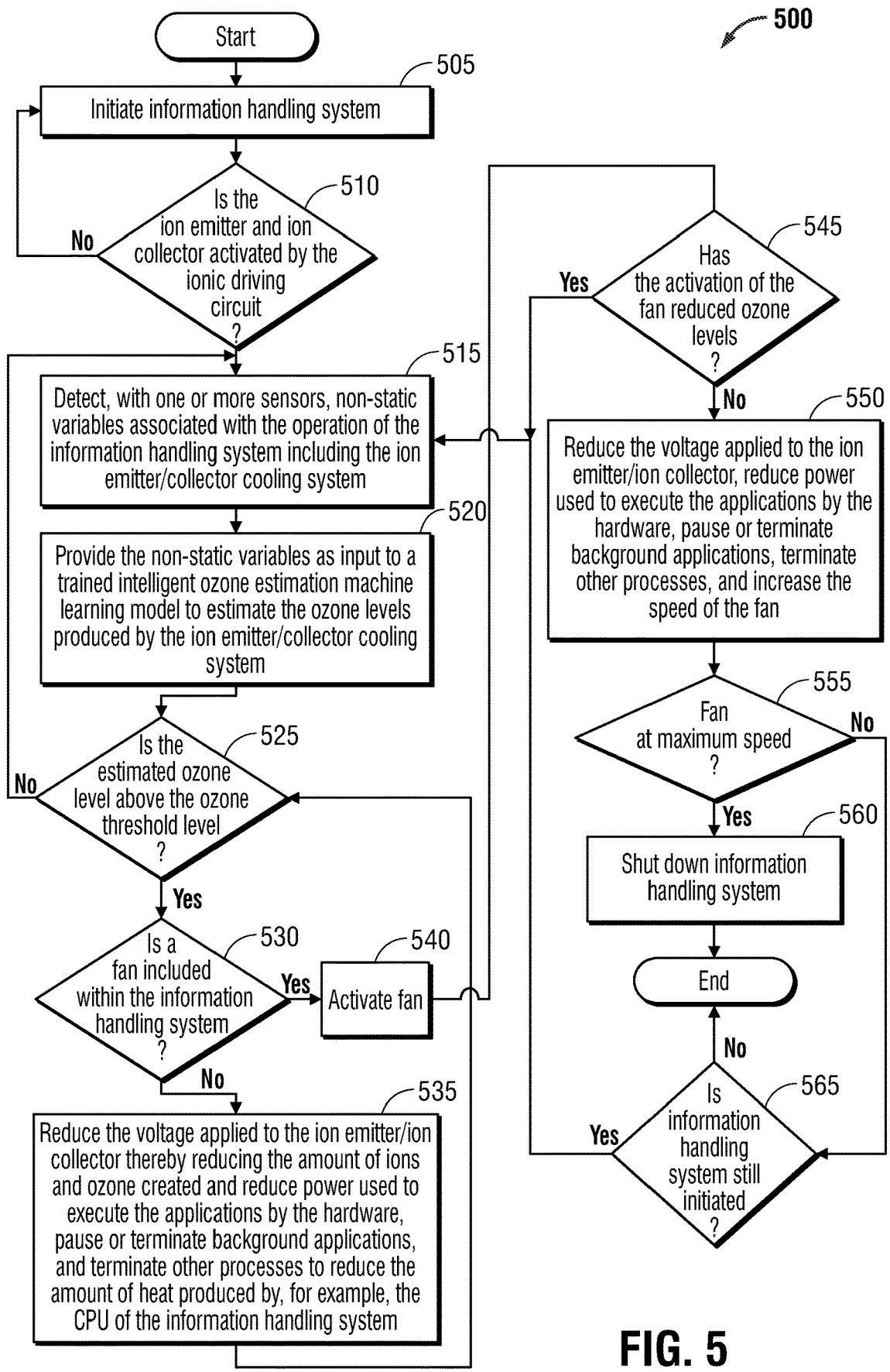
FIG. 5 is a flow diagram of a method of executing, with a hardware processor of an information handling system, a trained intelligent ozone estimation machine learning model according to an embodiment of the present disclosure.

FIG. 5 is a flow diagram of a method 500 of executing, with a hardware processor of an information handling system, a trained ozone estimation machine learning model of the intelligent ozone estimation and mitigation system according to an embodiment of the present disclosure. The method 500 includes, at block 505 with the user initiating the information handling system. This initiation process may be conducted by the user actuating, for example, a power key on the client information handling system. The actuation of this power key may cause the execution of a native BIOS, a native OS, or other code instructions used and executed by the hardware processor of the information handling system to operate the hardware within the information handling system including the enclosed ion emitter cooling system described herein. In an embodiment, the initiation of the information handling system may further include an initiation of a hardware controller, a PMU controller, or hardware processor to execute code instructions of an ion emitter control system to control an ionic driving circuit for the enclosed ion emitter cooling system described herein.

The execution of the ion emitter/ion collector cooling system according to a method 500 described herein includes, at block 510, determining if the ion emitter and ion collector is activated by the ionic driving circuit. This may be determined by the hardware processor (e.g., CPU) or a hardware controller associated with PMU in an example embodiment. Where the ion emitter and ion collector are not activated, the method 500 continues with monitoring for when the ion emitter and ion collector is activated at block 510.

Where the ion emitter and ion collector are activated, the method 500 continues with detecting, within one or more sensors, non-static measurement variables or variable values, also referred to as non-static variables, associated with the operation of the information handling system at block 515. In an embodiment, non-static variables may also have been used to initially train the trained ozone estimation machine learning model at, for example, the manufacturer of this type and model of information handling system. In the method 500, these non-static variables are used as input in the trained ozone estimation machine learning model when the information handling system is operated by the user. Data associated with these non-static variables may be detected and measured using one or more of the sensors described herein. In an example embodiment, a non-static measurement that is used as input to train the trained ozone estimation machine learning model includes data received from a power consumption sensor. Power consumption at the information handling system may relate to the amount of heat generated by heat-generating hardware within the housing of the information handling system. This is because the amount of power used by, for example, the hardware processor relates to the amount of heat produced by the hardware processor, and this similarly applies to other hardware operating within the information handling system.

In an example embodiment, a non-static variable that is used as input to the trained ozone estimation machine learning model includes an ion emitter and ion collector operating voltage obtained via an ion emitter and ion collector operating voltage sensor or as determined via the PMU. As described herein, as the voltage difference between the ion emitter and ion collector creates a larger electric field difference between them to initiate the creation of ions. This larger field difference can create ions and cause ion flow along field lines at a relatively more rapid pace than a lower electric field difference. Again, as the generation of ions at the ion emitter increases, the instances of the creation of ozone also increases. Increased speed of ion flow also means more ozone molecules may pass the collector and escape the housing of the client information handling system.

In an example embodiment, a non-static variable that is used as input to the trained ozone estimation machine learning model includes data obtained from one or more temperature sensors placed at various locations within the information handling system to monitor for temperatures within the housing of the information handling system. This includes temperature sensors at the heat-generating devices for which the ion emitter/collector cooling system with its ion emitter/ion collector and any optional fan system are used to cool those devices. Again, an increase in heat may be indicative of an increase in power usage which results in an increase in the voltage applied to the ion emitter and ion collector to create the sufficient airflow used to cool these hardware devices as described herein.

In an example embodiment, a non-static measurement that is used as input to the trained ozone estimation machine learning model includes data obtained from one or more humidity sensors. In some embodiments, higher temperatures such as those detected within a housing of the information handling system are generally associated with higher ozone levels while higher relative humidity are generally associated with lower ozone levels. In this example embodiment, current temperature and the humidity levels (e.g., within the housing or outside of the housing of the information handling system) may affect the levels of ozone production and presence. Other indirect non-static variables may also be detected and measured in other embodiments for input into the trained ozone estimation machine learning model in various embodiments herein.

At block 520, the method 500 includes providing the non-static variables as input to the trained ozone estimation machine learning model of the intelligent ozone estimation and mitigation system executed by the CPU of the information handling system. The trained ozone estimation machine learning model may include deep neural nets (DNNs), a Newton-Raphson function with a second order Taylor approximation (e.g., XGBoost® by the XGBoost Contributors), support vector regressions, along with other supervised and unsupervised machine learning models. As described herein, the trained ozone estimation machine learning model may receive, as input, the non-static and static variables described herein to provide output estimations of ozone levels produced by the ion emitter and ion collector for mitigation if the estimated ozone levels exceed an ozone threshold level.

The method 500 further includes, at block 525, determining if the estimated ozone levels received as output from the execution of the trained ozone estimation machine learning model exceed ozone threshold levels. In an embodiment, the ozone threshold limit may be set to an ozone level that is approved by, for example, a governmental entity such as the OSHA in the United States. Other ozone threshold limits may be set such as ozone levels at or below 0.1 ppm over an eight-hour time frame or 0.2 ppm within a four-hour time frame and the like. In an embodiment, the ozone threshold limit may be set at an ozone level below those described herein in order to prevent ozone levels reaching potentially unacceptable levels. It is appreciated that multiple ozone threshold levels may be set, and that the ozone threshold level described in block 525 could be a first of many ozone threshold levels used during this process to mitigate ozone at or around the information handling system.

Where the estimated ozone threshold limit has not been reached at block 525, the method 500 proceeds to block 515 to monitor the sensors to continue to detect and measure non-static variables. Where the estimated ozone threshold limit has been reached, the method 500 continues to block 530.

At block 530, determining if a fan is included within the housing of the information handling system. As described herein, the fan is used to supplement the creation of airflow by the ion emitter and the ion collector of the ion emitter/collector cooling system. The determination of whether a fan is used to supplement the creation of the airflow may be one of many of the static variables previously used in the training of the trained ozone estimation machine learning model and the hardware processing resource may access a data table to determine if the type of model of the client information handling system includes a fan. Where it is determined at block 530 that the information handling system does not include a fan, the process may proceed with reducing the voltage applied to the ion emitter/ion collector thereby reducing the level of ions and ozone created and potentially the amount of airflow created by the ion emitter/ion collector cooling system driven by the ionic driving circuit. In another embodiment, the power used by the hardware processor to execute the applications may also be reduced by throttling the hardware processor. Further, background applications may be paused or terminated, and other processes may be terminated to reduce the amount of heat produced by, for example, the CPU of the information handling system in some embodiments. Other power usage limits may be applied to reduce heat from heat producing components as well in other embodiments.

Where it is determined, at block 530, that the information handling system does include a fan, the method 500 includes the activation of the fan if the fan is not already activated at block 540 to help disperse the ozone levels or where the fan is already in operation increasing fan speed of the fan.

A determination is then made at block 545 as to whether the activation of the fan will reduce the ozone levels by executing the trained ozone estimation machine learning model. Where the ozone levels are estimated to have been decreased, the method 500 may return to block 515 to monitor sensors to continue detecting and measuring non-static variables at the information handling system as described herein.

In an embodiment where the ozone levels are not estimated to decrease sufficiently, the method 500 includes reducing the voltage applied to the ion emitter/ion collector, reducing power used by the hardware processor to execute the applications, pausing or terminating background applications, terminating other processes, or increasing the speed of the fan. As described herein, the ozone mitigation system may increase the speed of the fan in order to create more airflow through the housing of the information handling system. In an embodiment, the estimated ozone levels provided via execution of the trained ozone estimation machine learning model may determine if the fan is to be operated, how fast the fan speed is to be increased or decreased, and to what degree the voltage applied to the ion emitter/ion collector is to be reduced in order to reduce the amount of ions and ozone created relative to the amount of airflow created by the ion emitter/ion collector driven by the ionic driving circuit or by an active fan. In this example embodiment, where a threshold ozone limit has been reached, the operation of the ion emitter/ion collector may be reduced (e.g., voltage applied to ion emitter/ion collector is reduced) while the operation of the fan is increased. As described herein, multiple ozone threshold limits may be used to dictate, in a stepped fashion, to what degree the operation of the ion emitter/ion collector may be reduced (e.g., voltage applied to ion emitter/ion collector is reduced) while the operation of the fan is increased.

The method 500 further includes determining whether a maximum speed of the fan has been reached at block 555. Where heat levels are high and maximum fan speed has been reached but estimated ozone levels have not fallen below the ozone threshold levels then the information handling system may shutdown at block 560. The information handling system shutdown may occur in order to immediately stop the operation of the ion emitter/ion collector and the creation of ozone and when further measures to cool the information handling system temperature levels are unavailable because the previous mitigation processes have not limited or reduced the level of ozone the user is subjected to. At this point, the method 500 may end. Where the maximum fan speed has not been reached at block 555, the method 500 includes determining, at block 565, whether the information handling system is still initiated. Where the information handling system is no longer initiated (e.g., power has been removed from the information handling system via actuation of a power button), the method 500 may end here. Where the information handling system is still initiated, the method 500 may return to block 525 to continue detecting and monitoring the non-static variables of the information handling system and the method 500 may proceed as described in embodiments herein.

The blocks of the flow diagrams of FIGS. 4 and 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor;
a memory device;
a power management unit (PMU) to provide power to the processor and memory device;
an ion emitter/collector cooling system including an ion emitter and an ion collector, the ion emitter to generate ions from an atmosphere at the ion emitter where the ion collector to collect and deionize those ions, the creation of ions by the ion emitter creating an airflow through and out of the ion collector; and
at least one sensor to detect and measure at least one non-static ozone predictor measurement describing ozone production at the ion emitter/collector cooling system;
the processor executing code instructions of an intelligent ozone estimation and mitigation system including a trained ozone estimation machine learning model to use, as input, the non-static ozone predictor measurement and provide, as output, an ozone estimation value estimating the amount of ozone produced at the ion emitter.

2. The information handling system of claim 1 further comprising:
the at least one sensor comprising:
a power consumption sensor;
an ion emitter operating voltage sensor and an ion collector operating voltage sensor;
a temperature sensor; or
a humidity sensor.

3. The information handling system of claim 1, wherein the processor is the central processing unit (CPU) of the information handling system.

4. The information handling system of claim 1 further comprising:
the PMU including a hardware controller to control power to the emitter and to the collector to control the generation of charged ions.

5. The information handling system of claim 1 further comprising:
the trained ozone estimation machine learning model is trained with static ozone predictor variable values that include:
a distance between the ion emitter and ion collector;
orientations of the information handling system during use;
an average distance from the user to an exhaust vent in the information handling system; or
a size of the emitter as compared to the size of the collector.

6. The information handling system of claim 1, further comprising:
the processor to receive, via a network connection facilitated by a network adapter, updated trained ozone estimation machine learning models to be executed by the processor.

7. The information handling system of claim 1 further comprising:
the intelligent ozone estimation and mitigation system including the processor executing code instructions of an ozone mitigation system to control an operating voltage and power provided to the ion emitter and ion collector to reduce the ozone created by the ion emitter/collector cooling system when the ozone estimation value estimating the amount of ozone produced at the ion emitter reaches an ozone threshold limit.

8. The information handling system of claim 1 further comprising:
a fan used to create supplemental airflow through a housing of the information handling system in addition to the airflow created by the ion emitter and ion collector; and
the processor executing code instructions of an ozone mitigation system to control an operating speed of the fan to dilute the amount of ozone created by the ion emitter/collector cooling system within the atmosphere when the ozone estimation value estimating the amount of ozone produced at the ion emitter reaches an ozone threshold limit.

9. An ion emitter/collector cooling system for an information handling system comprising:
a central processing unit (CPU) of the information handling system;
an ion emitter/collector cooling system operatively coupled to the CPU and including an ion emitter and an ion collector, the ion emitter/collector cooling system to generate ions from an atmosphere at the ion emitter and the ion collector to collect and deionize those ions, the creation of ions by the ion emitter creating an airflow through and out of the ion collector;
at least one sensor to detect at least one non-static ozone predictor measurement relating to ozone production at the ion emitter/collector cooling system;
the CPU executing code instructions of an intelligent ozone estimation and mitigation system including a trained ozone estimation machine learning model to use, as input, the ozone predictor measurement and provide, as output, an ozone estimation value estimating the amount of ozone produced at the ion emitter/collector cooling system.

10. The ion emitter/collector cooling system of claim 9 further comprising:
the at least one sensor including a power consumption sensor or an ion emitter operating voltage sensor and an ion collector operating voltage sensor.

11. The ion emitter/collector cooling system of claim 9, further comprising:
the at least one sensor including:
a temperature sensor; or
a humidity sensor.

12. The ion emitter/collector cooling system of claim 9 further comprising:
a power management unit (PMU) to provide power to the ion emitter and ion collector, the PMU including a hardware controller to control power to the emitter and collector to control the creation of charged ions.

13. The ion emitter/collector cooling system of claim 9 wherein the trained ozone estimation machine learning model is trained with static ozone predictor variable values that include:
a distance between the emitter and collector;
size of the emitter compared to the size of the collector; or
a combination thereof.

14. The ion emitter/collector cooling system of claim 9 wherein the trained ozone estimation machine learning model is trained with static ozone predictor variable values that include:

orientations of the information handling system during use; and average distance from the user to an exhaust vent in the information handling system.

15. The ion emitter/collector cooling system of claim 9 further comprising:

the CPU executing code instructions of an ozone mitigation system to control an operating voltage and power provided to the ion emitter and ion collector to reduce the ozone created by the ion emitter/collector cooling system when the ozone estimation value estimating the amount of ozone produced at the ion emitter indicates that an ozone threshold limit has been reached.

16. The ion emitter/collector cooling system of claim 9 further comprising:

a fan used to create supplemental airflow through a housing of the information handling system in addition to the airflow created by the ion emitter and ion collector; and the CPU executing code instructions of an ozone mitigation system to control an operating speed of the fan to dilute the amount of ozone created by the ion emitter/collector cooling system within the atmosphere when the ozone estimation value estimating the amount of ozone produced at the ion emitter indicates that an ozone threshold limit has been reached.

17. The ion emitter/collector cooling system of claim 9 further comprising:

the CPU executing code instructions of an ozone mitigation system to provide a message to be presented to the user of the information handling system via a display device indicating high levels of ozone present when the ozone estimation value estimating the amount of ozone produced at the ion emitter/collector cooling system has reached that an ozone threshold limit.

18. A method of operating an ion emitter/collector cooling system of an information handling system comprising:

at the ion emitter/collector cooling system that includes an ion emitter and an ion collector, generating ions from an atmosphere at the ion emitter and collecting and deionizing those ions at the ion collector, the creation of ions by the ion emitter creating an airflow through and out of the ion collector; and with code instructions of an intelligent ozone estimation and mitigation system executed by a hardware processing device of the information handling system:

detecting and measuring at least one non-static ozone predictor measurement relating to ozone production at the ion emitter/collector cooling system with at least one sensor;

providing, as input, the non-static ozone predictor measurement to a trained ozone estimation machine learning model executable by the hardware processing device; and receiving, as output, an ozone estimation value estimating the amount of ozone produced at the ion emitter/collector cooling system and not collected and deionized by the ion collector.

19. The method of claim 18 further comprising:

with code instructions of an ozone mitigation system executed by the hardware processing device, controlling an operating voltage and power provided to the ion emitter and ion collector to reduce the ozone created by the ion emitter when the ozone estimation value estimating the amount of ozone produced at the ion emitter reaches an ozone threshold limit.

20. The method of claim 18 further comprising:

with a fan, creating supplemental airflow through a housing of the information handling system in addition to the airflow created by operation of the ion emitter and ion collector; and with code instructions of an ozone mitigation system executed by the hardware processing device, turning on the fan to dilute the amount of ozone created by the ion emitter/collector cooling system within the atmosphere when the ozone estimation value estimating the amount of ozone produced at the ion emitter/collector cooling system reaches an ozone threshold limit.

\* \* \* \* \*